US005117864A

United States Patent [19]

Byers

[11] Patent Number: 5,117,864

[45] Date of Patent: Jun. 2, 1992

[54] VALVE SEAL TOOL

[76] Inventor: Richard V. Byers, 2737 Kinsey, Des Moines, Iowa 50317

[21] Appl. No.: 760,082

[22] Filed: Sep. 16, 1991

[51] Int. Cl.$^5$ .............................................. B23P 19/04

[52] U.S. Cl. ............................... 137/561 A; 29/213.1; 29/888.011; 123/90.1

[58] Field of Search ........................ 137/561 A, 561 R; 29/888.011, 213.1, 252; 123/90.1

[56] References Cited

U.S. PATENT DOCUMENTS

| | | | |
|---|---|---|---|
| 1,898,720 | 2/1933 | Elder | 29/213.1 |
| 3,898,726 | 8/1975 | Godart et al. | 29/213.1 |
| 4,292,719 | 10/1981 | Britton, Jr. | 29/213.1 X |
| 4,294,141 | 10/1981 | Miller | 29/252 X |
| 4,562,629 | 1/1986 | Cerio | 29/213.1 X |
| 4,787,130 | 11/1988 | Hale et al. | 29/213.1 |

*Primary Examiner*—John Rivell
*Attorney, Agent, or Firm*—Leon Gilden

[57] ABSTRACT

A valve seal tool includes a connector conduit directed into an air manifold, wherein the air manifold fixedly mounts a series of flexible conduits, each flexible conduit including a quick-connector mounted at its distal terminal end for securement to a respective further flexible conduit that includes at the further flexible conduit's distal end a spark plug connector for directing into an associated spark plug bore of a cylinder head of an internal combustion engine. A modification of the invention includes a line rupture harness for maintaining association of the conduits together and prevent damage to components about the internal combustion engine due to line rupture.

3 Claims, 4 Drawing Sheets

FIG. 4
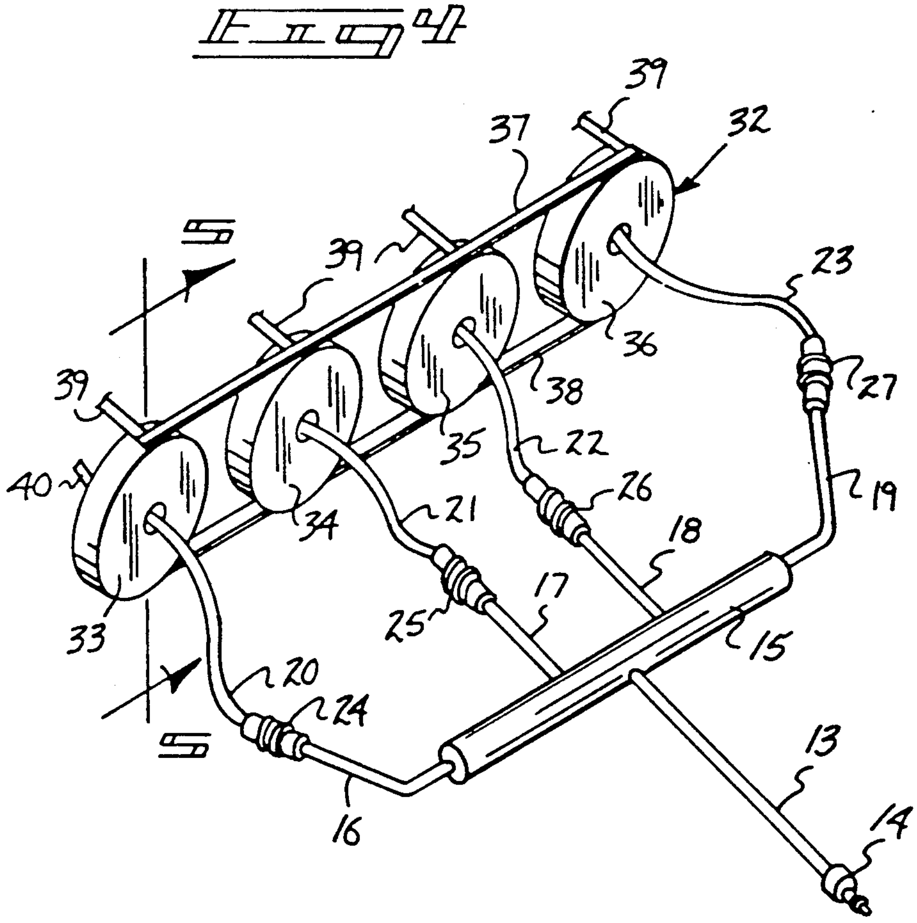
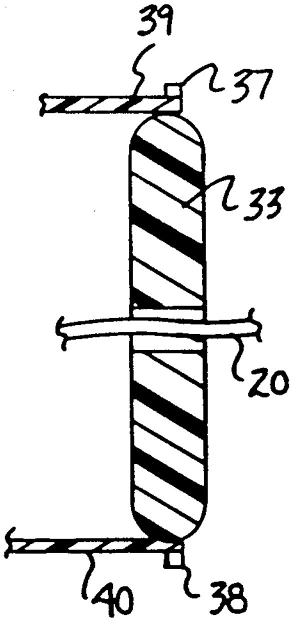
FIG. 5

VALVE SEAL TOOL

BACKGROUND OF THE INVENTION

1. Field of the Invention

The field of invention relates to automotive tools, and more particularly pertains to a new and improved valve seal tool wherein the same directs simultaneously into each cylinder of an internal combustion engine pressurized air to maintain the valves in a sealed relationship during replacement of valve seals relative to each valve.

2. Description of the Prior Art

Valve seal tool structure has been utilized in the prior art to direct compressed air into each cylinder, either individual or simultaneously, to provide for pressurized air maintaining the valves in a closed configuration to permit repair of defective valve springs or valve seal structure and the like relative to each valve of the internal combustion cylinder head.

Such structure is exemplified in U.S. Pat. No. 4,787,130 to Hale, et al. setting forth a manifold mounting a plurality of spark plug conduits to direct compressed air into each cylinder.

U.S. Pat. No. 4,292,719 to Britton, Jr. sets forth an engine valve tool for removing defective hydraulic lifters relative to a internal combustion engine.

As such, it may be appreciated that there continues to be a need for a new and improved valve seal tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of valve seal tool apparatus now present in the prior art, the present invention provides a valve seal tool wherein the same is directed to project compressed air simultaneously into each cylinder of an internal combustion engine As such, the general purpose of the present invention, which will be described subsequently in greater detail, is to provide a new and improved valve seal tool which has all the advantages of the prior art valve seal tools and none of the disadvantages.

To attain this, the present invention provides a valve seal tool including a connector conduit directed to an air manifold, wherein the air manifold fixedly mounts a series of flexible conduits, each flexible conduit including a quick-connector mounted at its distal terminal end for securement to a respective further flexible conduit that includes at the further flexible conduit's distal end a spark plug connector for directing into an associated spark plug bore of a cylinder head of an internal combustion engine. A modification of the invention includes a line rupture harness for maintaining association of the conduits together and prevent damage to components about the internal combustion engine due to line rupture.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved valve seal tool which has all the advantages of the prior art valve seal tools and none of the disadvantages.

It is another object of the present invention to provide a new and improved valve seal tool which may be easily and efficiently manufactured and marketed.

It is a further object of the present invention to provided a new and improved valve seal tool which is of a durable and reliable construction.

An even further object of the present invention is to provide a new and improved valve seal tool which is susceptible of a low cost of manufacture with regard to both materials and labor, and which accordingly is then susceptible of low prices of sale to the consuming public, thereby making such valve seal tools economically available to the buying public.

Still yet another object of the present invention is to provide a new and improved valve seal tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric partial view of the line rupture harness utilized by the invention.

FIG. 5 is an orthographic view taken along the lines 5—5 of FIG. 4 in the direction indicated by the arrows.

DESCRIPTION OF THE PREFERRED EMBODIMENT

Figure 1:
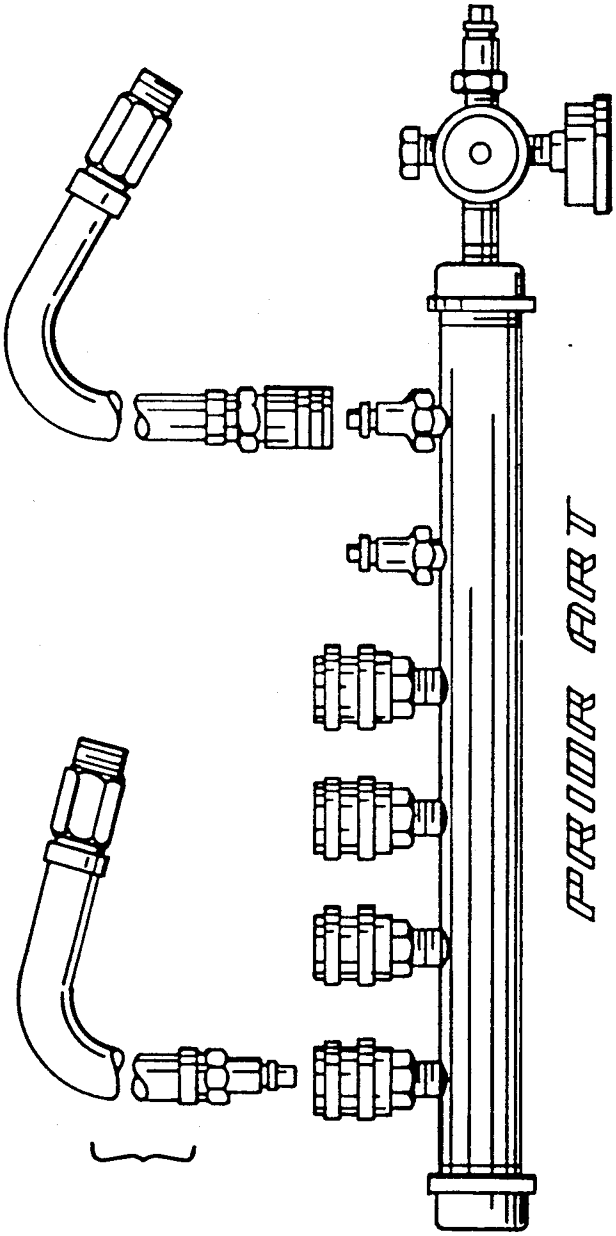
PRIOR ART FIG. 1
FIG. 1 is an orthographic side view of a prior art valve seal tool construction.

With reference now to the drawings, and in particular to FIGS. 1 to 8 thereof, a new and improved valve seal tool embodying the principles and concepts of the present invention and generally designated by the reference numeral 10 will be described.

FIG. 1 sets forth an example of a prior art valve seal tool illustrating the use of a single manifold utilizing quick-coupling connectors to mount various compressed air conduits into the associated organization, as set forth in U.S. Pat. No. 4,787,130.

Figure 2:
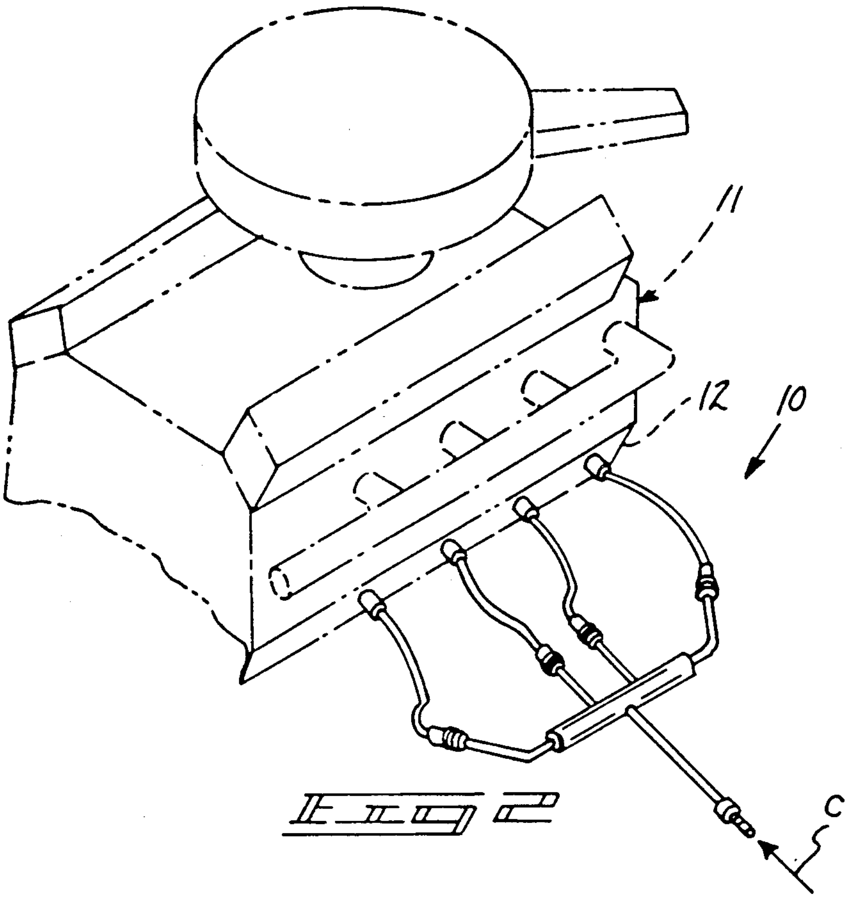
FIG. 2 is an isometric illustration of the instant invention in use.
Figure 3:
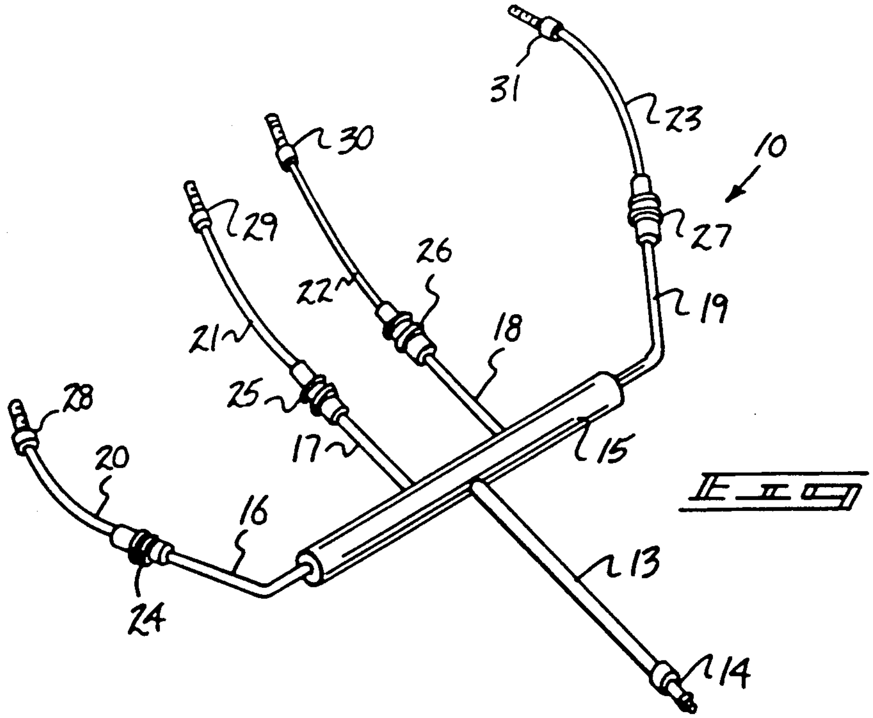
FIG. 3 is an enlarged isometric illustration of the instant invention.

More specifically, the valve seal tool 10 of the instant invention essentially comprises the tool 10 mounted to an internal combustion engine 11, and more specifically the cylinder head 12 thereof, directed into each respective spark plug hole of the cylinder head 12. The organization includes a flexible primary delivery conduit 13 including a conduit connector 14 for securement to a source of compressed air "C", as illustrated in FIG. 2. The primary conduit 13 is in pneumatic communication with an air manifold 15 secured thereto, wherein the air manifold 15 includes a respective first, second, third, and fourth pneumatic conduit 16, 17, 18, and 19 respectively. The first through fourth conduits are fixedly secured to the air manifold and at their distal end of each respective pneumatic conduit 16-19 is provided a respective first through fourth connector coupling 24, 25, 26, and 27 defined by a first, second, third, and fourth connector coupling respectively. The connector couplings 24-27 permit selective securement to a respective fifth, sixth, seventh, and eighth pneumatic conduit 20, 21, 22, and 23 for coupling in a pneumatic communication to the respective first, second, third, and fourth pneumatic conduits 16-19. The distal free end of the fifth through eighth pneumatic conduits 20-23 include respective first, second, third, and fourth cylindrical fittings 28, 29, 30, and 31. Such fittings are exemplified in U.S. Pat. No. 4,787,130 incorporated herein by reference of an externally threaded type to be received within the respective spark plug opening of the cylinder head 12. The quick-coupling connectors are also exemplified in the U.S. Pat. No. 4,787,130 incorporated herein by reference indicated by the numerals 32 and 38.

In this manner, simultaneous connection to each spark plug opening of a respective eight cylinder engine is provided to provide simultaneous securement to each cylinder head.

Figure 6:
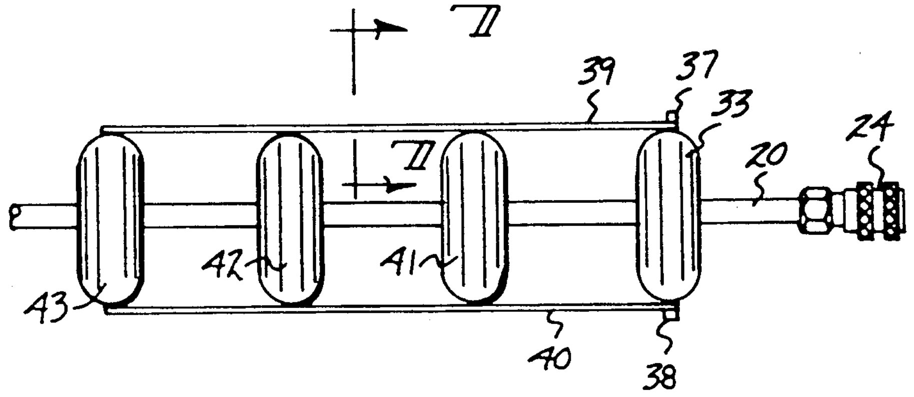
FIG. 6 is an orthographic side view of each series of bumpers associated with each compressed air conduit for each cylinder of the internal combustion engine.
Figure 7:
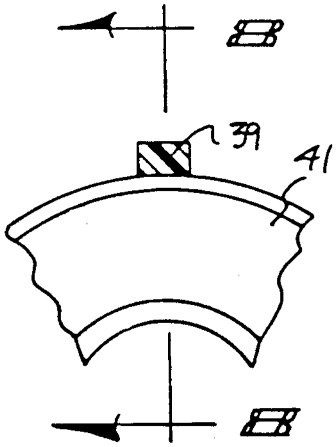
FIG. 7 is an orthographic view, taken along the lines 7—7 of FIG. 6 in the direction indicated by the arrows.
Figure 8:
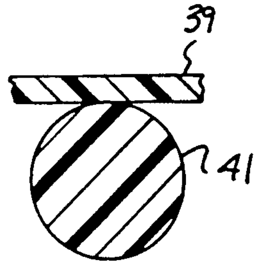
FIG. 8 is an orthographic view, taken along the lines 8—8 of FIG. 7 in the direction indicated by the arrows.

The use of pneumatic conduits provides an ever present condition of potential line rupture with attendant damage to various components of an internal combustion engine or accessories thereabout and to minimize this danger, a line rupture harness 32 is provided as illustrated in partial view in the FIG. 4. The harness 32 includes a respective first, second, third, and fourth resilient torroidal lead bumper 33, 34, 35, and 36 respectively, with each bumper including a central coaxial aperture to receive a respective pneumatic conduit of the fifth through eighth conduits 20-23 respectively therethrough. Each lead bumper is a lead bumper of a series of series bumpers, as illustrated in FIG. 6. It should be further noted that each of the lead bumpers 33-36 are interconnected by respective first and second flexible resilient connector band 37 and 38 diametrically and fixedly mounted to interconnect the first through fourth bumpers together and to further maintain alignment of the fifth through eighth pneumatic conduits 20-23.

FIG. 6 illustrates the series bumpers to include a respective second, third, and fourth series bumper 41, 42, and 43 associated with each of the lead bumpers 33-36. The series bumpers are connected to the lead bumper by respective first and second further connected bands 39 and 40 mounted to diametrically opposed sides of the lead bumper and the series bumpers, as exemplified in FIG. 6. In this manner, the individual fifth through eighth conduits 20-23 in the event of a line rupture include the series of resilient torroidal bumpers, as illustrated in FIG. 6, to contain the respective pneumatic conduit preventing its flailing and agitation during such rupture.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A valve seal tool for use in association with an internal combustion engine, wherein the internal combustion engine includes at least one cylinder head, including a plurality of cylinders, and each cylinder includes an internally threaded spark aperture and wherein the tool comprises, a flexible delivery primary conduit, the primary conduit including a primary conduit connector for securement to a source of compressed air, the primary conduit fixedly secured to an air manifold spaced from the primary conduit connector, the air manifold including a respective first, second, third, and fourth flexible pneumatic conduit in pneumatic communication with the air manifold, the first, second, third, and fourth pneumatic conduits include a respective first, second, third, and fourth connector coupling mounted to each respective pneumatic conduit, wherein the first, second, third, fourth connector couplings include respective fifth, sixth, seventh, and eighth flexible pneumatic conduit, and the fifth, sixth, seventh, and eighth pneumatic conduits include respective first, second, third, and fourth externally threaded cylinder fittings for securement into each respective internally threaded spark plug bore of the internal combustion engine, and wherein the fifth, sixth, seventh, and eighth pneumatic conduits include a line rupture harness secured thereto.

2. A tool as set forth in claim 1 wherein the line rupture harness includes a respective first, second, third, and fourth torroidal lead bumper coaxially receiving the respective fifth, sixth, seventh, and eighth pneumatic conduits therethrough, and the first, second, third, and fourth lead bumpers include a respective first and second flexible resilient connector band tangentially and fixedly secured to each of the first, second, third, and fourth lead bumpers to interconnect the lead bumpers together, with the first and second flexible resilient connector bands mounted in a spaced relationship diametrically opposed relative to one another in securement to the first, second, third, and fourth lead bumpers.

3. A tool as set forth in claim 2 wherein each lead bumper of said first, second, third, and fourth lead bumpers include a respective first and second further connector band mounted to diametrically opposed sides of the lead bumper, and the first and second further connector bands mount a plurality of torroidal series bumpers therebetween, wherein the series bumpers mounted to the first lead bumper directs the fifth pneumatic conduit coaxially therethrough, the series bumpers mounted to the second lead bumper mounts the sixth pneumatic conduit therethrough, the series bumpers mounted to the third lead bumper mounts the seventh conduit coaxially therethrough, and the lead bumper is mounted to the fourth lead bumper mounts the eighth pneumatic conduit coaxially therethrough.

* * * * *